United States Patent
Suriano et al.

(10) Patent No.: US 11,395,719 B2
(45) Date of Patent: Jul. 26, 2022

(54) UNIMPEDED DISTALIZING JIG

(71) Applicants: Anthony T Suriano, Gladstone, NJ (US); Justin T. Suriano, Montclair, NJ (US)

(72) Inventors: Anthony T Suriano, Gladstone, NJ (US); Justin T. Suriano, Montclair, NJ (US)

( * ) Notice: Subject to any disclaimer, the term of this patent is extended or adjusted under 35 U.S.C. 154(b) by 0 days.

(21) Appl. No.: 16/687,573

(22) Filed: Nov. 18, 2019

(65) Prior Publication Data

US 2020/0163742 A1 May 28, 2020

Related U.S. Application Data

(60) Provisional application No. 62/771,495, filed on Nov. 26, 2018.

(51) Int. Cl.
*A61C 7/36* (2006.01)
*A61C 7/10* (2006.01)
*A61C 7/14* (2006.01)

(52) U.S. Cl.
CPC ............ *A61C 7/14* (2013.01); *A61C 7/10* (2013.01); *A61C 7/36* (2013.01)

(58) Field of Classification Search
CPC .... A61C 7/14; A61C 7/10; A61C 7/36; A61C 7/00
See application file for complete search history.

(56) References Cited

U.S. PATENT DOCUMENTS

| 1,582,570 | A | | 4/1926 | Brust |
| 1,908,853 | A | | 5/1933 | Linde |
| 2,104,192 | A | | 1/1938 | Ford |
| 3,162,948 | A | | 12/1964 | Gerber |
| 3,293,747 | A | | 12/1966 | Denholtz |
| 3,690,003 | A | * | 9/1972 | Gerber ............ A61C 7/12 433/18 |

(Continued)

FOREIGN PATENT DOCUMENTS

| DE | 4114285 C1 * | 12/1992 | ............ A61C 7/36 |
| EP | 0931518 A1 | 7/1999 | |

(Continued)

OTHER PUBLICATIONS

DE 4114285 Description English Translation (Year: 1992).*

(Continued)

*Primary Examiner* — Heidi M Eide
(74) *Attorney, Agent, or Firm* — Hoffberg & Associates; Steven M. Hoffberg

(57) ABSTRACT

An unimpeded distalizing jig, comprising a pair of tooth bond pads, an intra dental arch telescoping assembly, comprising a rod-like insertion and a tubular shell, which constrains the rod-like insertion to move with respect to the tubular shell along an elongated axis, which may be a radial path; and a force generating structure configured to supply an off-axis distalizing force to the intra dental arch telescoping assembly, such that the distalizing force is provided to the posterior tooth substantially without applying an anteriorizing force on the anterior tooth. The force generating structure may be an elastic band fixed by a hook to the tubular shell on one side, and to a molar on an opposing dental arch on the other side.

20 Claims, 4 Drawing Sheets

(56) References Cited

U.S. PATENT DOCUMENTS

| | | | |
|---|---|---|---|
| 3,800,420 A | 4/1974 | Ouaknine |
| 3,835,540 A | 9/1974 | Biederman |
| 4,192,070 A | 3/1980 | Lemchen et al. |
| 4,348,177 A | 9/1982 | Kurz |
| 4,354,834 A | 10/1982 | Wilson |
| 4,373,914 A | 2/1983 | Colbert |
| 4,416,627 A | 11/1983 | Beazley |
| 4,427,380 A | 1/1984 | Carter et al. |
| 4,431,411 A | 2/1984 | Witzig et al. |
| 4,462,800 A | 7/1984 | Jones |
| 4,468,196 A | 8/1984 | Keller |
| 4,483,674 A | 11/1984 | Schutz |
| 4,490,112 A | 12/1984 | Tanaka et al. |
| 4,496,317 A | 1/1985 | Hulsey |
| 4,525,143 A | 6/1985 | Adams |
| 4,571,178 A | 2/1986 | Rosenberg |
| 4,592,725 A | 6/1986 | Goshgarian |
| 4,595,361 A | 6/1986 | Blechman et al. |
| 4,676,745 A | 6/1987 | Zurita |
| 4,708,646 A | 11/1987 | Jasper |
| 4,713,000 A | 12/1987 | Rosenberg |
| 4,795,342 A | 1/1989 | Jones |
| 4,802,849 A | 2/1989 | Collins, Jr. |
| 4,818,226 A | 4/1989 | Berendt et al. |
| 4,867,679 A | 9/1989 | Rackley |
| 4,871,310 A | 10/1989 | Vardimon |
| 5,002,485 A | 3/1991 | Aagesen |
| 5,007,828 A | 4/1991 | Rosenberg |
| 5,011,404 A | 4/1991 | Losi |
| 5,022,855 A | 6/1991 | Jeckel |
| 5,064,370 A | 11/1991 | Jones |
| 5,066,224 A | 11/1991 | Block et al. |
| 5,087,196 A | 2/1992 | Polanco |
| 5,092,768 A | 3/1992 | Korn |
| 5,183,388 A | 2/1993 | Kumar |
| 5,205,736 A | 4/1993 | Blechman |
| 5,240,413 A | 8/1993 | Ashinoff |
| 5,277,581 A | 1/1994 | Peterson |
| 5,281,133 A | 1/1994 | Farzin-Nia |
| 5,299,935 A * | 4/1994 | Lokar ................... A61C 7/00 |
| | | | 433/18 |
| 5,310,340 A | 5/1994 | Zedda |
| 5,334,015 A | 8/1994 | Blechman |
| 5,399,087 A | 3/1995 | Amdt |
| 5,429,501 A | 7/1995 | Farzin-Nia et al. |
| 5,439,377 A | 8/1995 | Milanovich |
| RE35,170 E | 3/1996 | Arndt et al. |
| 5,505,616 A | 4/1996 | Harwell |
| 5,538,422 A | 7/1996 | Amdt |
| 5,562,445 A | 10/1996 | DeVincenzo et al. |
| 5,599,183 A | 2/1997 | Razdolsky et al. |
| 5,622,493 A | 4/1997 | Razdolsky et al. |
| 5,632,618 A | 5/1997 | Jensen |
| 5,645,422 A | 7/1997 | Williams |
| 5,645,423 A | 7/1997 | Collins, Jr. |
| 5,645,424 A | 7/1997 | Collins, Jr. |
| 5,681,164 A | 10/1997 | Bass |
| 5,697,779 A | 12/1997 | Sachdeva et al. |
| 5,697,781 A | 12/1997 | Ellingson |
| 5,711,667 A | 1/1998 | Vogt |
| 5,738,514 A | 4/1998 | DeVincenzo et al. |
| 5,752,823 A | 5/1998 | Vogt |
| 5,769,631 A | 6/1998 | Williams |
| 5,775,907 A | 7/1998 | Razdolsky |
| 5,785,520 A | 7/1998 | Carano et al. |
| 5,820,369 A | 10/1998 | Kvarnstrom et al. |
| 5,829,970 A | 11/1998 | Yousefian |
| 5,829,971 A | 11/1998 | Razdolsky et al. |
| 5,829,975 A | 11/1998 | Gold |
| 5,846,074 A | 12/1998 | Klapper |
| 5,853,291 A | 12/1998 | DeVincenzo et al. |
| 5,873,715 A | 2/1999 | Liou |
| 5,895,217 A | 4/1999 | Kooiman |
| 5,897,313 A | 4/1999 | Cleary et al. |
| 5,919,042 A | 7/1999 | Williams |
| 5,938,437 A | 8/1999 | DeVincenzo |
| 5,944,518 A | 8/1999 | Sabbagh |
| 5,964,588 A | 10/1999 | Cleary |
| 5,967,772 A | 10/1999 | Gray |
| 6,036,488 A | 3/2000 | Williams |
| 6,039,564 A | 3/2000 | Hendrick |
| 6,082,996 A | 7/2000 | Haskell |
| 6,089,862 A | 7/2000 | Schutz |
| 6,113,390 A | 9/2000 | Simey et al. |
| 6,120,289 A | 9/2000 | Cleary et al. |
| 6,162,051 A | 12/2000 | Brehm et al. |
| 6,193,509 B1 | 2/2001 | DeVincenzo |
| 6,220,856 B1 | 4/2001 | Carano et al. |
| 6,241,517 B1 | 6/2001 | Williams |
| 6,322,357 B1 | 11/2001 | Vogt |
| 6,328,562 B1 | 12/2001 | Simey et al. |
| 6,341,956 B1 | 1/2002 | Liou |
| 6,358,046 B1 | 3/2002 | Brehm et al. |
| 6,382,966 B1 | 5/2002 | Aknin |
| 6,402,510 B1 | 6/2002 | Williams |
| 6,425,758 B1 | 7/2002 | Forster |
| 6,435,870 B1 | 8/2002 | Walde |
| 6,520,772 B2 | 2/2003 | Williams |
| 6,558,160 B2 | 5/2003 | Schnaitter et al. |
| 6,607,382 B1 | 8/2003 | Kuo et al. |
| 6,626,665 B1 | 9/2003 | Keles |
| 6,655,959 B2 | 12/2003 | Farzin-Nia et al. |
| 6,669,474 B2 | 12/2003 | Vogt |
| 6,719,557 B1 | 4/2004 | Williams |
| 6,729,876 B2 | 5/2004 | Chishti et al. |
| 6,783,360 B2 | 8/2004 | Chishti |
| 6,783,361 B2 | 8/2004 | Huge et al. |
| 6,827,574 B2 | 12/2004 | Payton |
| 6,877,982 B2 | 4/2005 | Williams |
| 6,908,306 B2 | 6/2005 | Bowman et al. |
| 6,913,460 B2 | 7/2005 | Cleary et al. |
| 6,932,598 B1 | 8/2005 | Anderson |
| 6,976,839 B2 * | 12/2005 | Lluch ................... A61C 7/00 |
| | | | 433/18 |
| 7,018,202 B2 | 3/2006 | Teramoto |
| 7,094,051 B2 | 8/2006 | Williams |
| 7,104,790 B2 | 9/2006 | Cronauer |
| 7,108,508 B2 | 9/2006 | Hedge et al. |
| 7,156,654 B2 | 1/2007 | Inman |
| 7,238,022 B2 | 7/2007 | Lluch |
| 7,322,987 B2 | 1/2008 | Schendel |
| 7,331,781 B1 | 2/2008 | Bandeen |
| 7,357,636 B2 | 4/2008 | Hedge et al. |
| 7,416,407 B2 | 8/2008 | Cronauer |
| 7,435,083 B2 | 10/2008 | Chishti et al. |
| 7,458,810 B2 | 12/2008 | Bergersen |
| 7,578,671 B2 | 8/2009 | Corcoran et al. |
| 7,578,672 B2 | 8/2009 | Sheikh et al. |
| 7,618,257 B2 | 11/2009 | Lluch |
| 7,785,102 B2 | 8/2010 | Papadopoulos |
| 7,837,904 B2 | 11/2010 | Hedge et al. |
| 7,878,803 B2 | 2/2011 | Mailyan |
| 7,880,751 B2 | 2/2011 | Kuo et al. |
| 7,905,724 B2 | 3/2011 | Kuo et al. |
| 7,930,189 B2 | 4/2011 | Kuo |
| 7,955,075 B2 | 6/2011 | Mailyan |
| 7,963,768 B2 | 6/2011 | Hilliard |
| 7,970,627 B2 | 6/2011 | Kuo et al. |
| 7,970,628 B2 | 6/2011 | Kuo et al. |
| 7,985,070 B2 | 7/2011 | Carriere Lluch |
| 7,987,099 B2 | 7/2011 | Kuo et al. |
| 8,099,305 B2 | 1/2012 | Kuo et al. |
| 8,126,726 B2 | 2/2012 | Matov et al. |
| 8,192,196 B2 | 6/2012 | Singh |
| 8,257,077 B2 | 9/2012 | Winsauer et al. |
| 8,257,078 B2 | 9/2012 | Winsauer et al. |
| 8,282,392 B2 | 10/2012 | Hilliard |
| 8,348,664 B2 | 1/2013 | Sheikh et al. |
| 8,371,846 B2 | 2/2013 | Kishi |
| 8,439,672 B2 | 5/2013 | Matov et al. |
| 8,807,996 B2 | 8/2014 | Benvegnu et al. |
| 8,807,998 B2 | 8/2014 | Lee |
| 8,874,452 B2 | 10/2014 | Kuo |
| 8,882,499 B2 | 11/2014 | White |

(56) References Cited

U.S. PATENT DOCUMENTS

| | | | |
|---|---|---|---|
| 8,900,282 | B2 | 12/2014 | Brawn |
| 8,905,754 | B1 * | 12/2014 | Ernstberger ............ A61C 7/00 433/18 |
| 8,930,219 | B2 | 1/2015 | Trosien et al. |
| 8,932,054 | B1 | 1/2015 | Rosenberg |
| 9,017,070 | B2 | 4/2015 | Parker |
| 9,101,437 | B2 | 8/2015 | Ziehmer |
| 9,107,722 | B2 | 8/2015 | Matov et al. |
| 9,144,474 | B2 | 9/2015 | Faust et al. |
| 9,237,941 | B2 | 1/2016 | Hayes |
| 9,242,118 | B2 | 1/2016 | Brawn |
| D751,208 | S | 3/2016 | Voudouris |
| 9,308,389 | B2 | 4/2016 | Brawn |
| 9,333,053 | B2 | 5/2016 | Alyami |
| 9,393,085 | B2 | 7/2016 | Mohr |
| 9,414,897 | B2 | 8/2016 | Wu et al. |
| 9,492,245 | B2 | 11/2016 | Sherwood et al. |
| 9,517,113 | B2 | 12/2016 | Bergersen |
| 9,532,854 | B2 | 1/2017 | Cinader, Jr. et al. |
| 9,539,066 | B2 | 1/2017 | Dickerson |
| 9,636,192 | B2 | 5/2017 | Faust et al. |
| 9,649,176 | B2 | 5/2017 | Carriere Lluch |
| 9,687,318 | B2 | 6/2017 | Carriere Lluch et al. |
| D794,804 | S | 8/2017 | Buddemeyer |
| 9,730,780 | B2 | 8/2017 | Brawn et al. |
| 9,731,365 | B2 | 8/2017 | Cranna |
| D802,145 | S | 11/2017 | Voudouris |
| 9,814,543 | B2 | 11/2017 | Huang et al. |
| 9,827,072 | B2 | 11/2017 | Carriere Lluch |
| 9,844,424 | B2 | 12/2017 | Wu et al. |
| 9,848,960 | B2 | 12/2017 | Dickerson |
| 9,861,451 | B1 | 1/2018 | Davis |
| 9,867,681 | B2 | 1/2018 | Radmall et al. |
| 9,877,803 | B2 | 1/2018 | Alyami |
| 9,925,019 | B2 | 3/2018 | Cinader, Jr. et al. |
| 9,980,791 | B1 | 5/2018 | Wang et al. |
| 9,987,104 | B2 | 6/2018 | Carriere Lluch |
| 10,004,574 | B2 | 6/2018 | Yousefian |
| 10,064,706 | B2 | 9/2018 | Dickerson |
| 10,092,375 | B2 | 10/2018 | Huang |
| 10,111,730 | B2 | 10/2018 | Webber et al. |
| D847,349 | S | 4/2019 | Edgren |
| D848,001 | S | 5/2019 | Buddemeyer et al. |
| 10,299,892 | B2 | 5/2019 | Alyami |
| 10,383,704 | B2 | 8/2019 | Kitching |
| D859,663 | S | 9/2019 | Cetta et al. |
| 10,413,385 | B2 | 9/2019 | Sherwood et al. |
| 10,433,932 | B2 | 10/2019 | Carriere Lluch |
| D910,191 | S | 2/2021 | Cetta et al. |
| 10,918,461 | B2 * | 2/2021 | Oliver ...................... A61C 7/20 |
| 2002/0001789 | A1 * | 1/2002 | Forster ..................... A61C 7/10 433/7 |
| 2002/0025502 | A1 | 2/2002 | Williams |
| 2003/0064344 | A1 | 4/2003 | Vazquez |
| 2003/0091952 | A1 | 5/2003 | Bowman et al. |
| 2003/0170585 | A1 | 9/2003 | Wilkerson |
| 2007/0218415 | A1 * | 9/2007 | Lluch ....................... A61C 7/00 433/7 |
| 2009/0035715 | A1 | 2/2009 | Cleary |
| 2010/0285422 | A1 | 11/2010 | Wiechmann |
| 2011/0300502 | A1 | 12/2011 | Kishi |
| 2012/0028208 | A1 | 2/2012 | Cleary |
| 2013/0089828 | A1 * | 4/2013 | Borovinskih ............ A61C 7/08 433/6 |
| 2013/0177861 | A1 | 7/2013 | Hayes |
| 2014/0072928 | A1 | 3/2014 | Morin et al. |
| 2014/0335468 | A1 * | 11/2014 | Dickerson ................ A61C 7/36 433/19 |
| 2019/0029776 | A1 * | 1/2019 | Voudouris ................ A61C 7/20 |
| 2019/0274788 | A1 | 9/2019 | Cetta et al. |
| 2020/0060789 | A1 * | 2/2020 | Sachdeva ................. A61C 5/30 |
| 2020/0146782 | A1 * | 5/2020 | Cope ....................... A61C 7/141 |

FOREIGN PATENT DOCUMENTS

| | | | |
|---|---|---|---|
| ES | 2049306 T3 | 4/1994 | |
| WO | WO 2019/000074 | * 1/2019 | ............ A61C 7/12 |

OTHER PUBLICATIONS

McNamara, James A., Lorenzo Franchi, Laurie McNamara McClatchey, Sarah E. Kowalski, and Camaron C. Cheeseman. "Evaluation of adolescent and adult patients treated with the Carriere Motion Class III appliance followed by fixed appliances." The Angle Orthodontist (2021).

Werner, Allison, "The Inventor's Path", Orthodontic Products (Mar. 30, 2021), https://orthodonticproductsonline.com/practice-management/practice-profiles/christopher-cetta-precision-aligner-buttons-inventors-path/.

Cetta, Chris, "Licensed to Sell", The Cosmos (Dec. 21, 2017) https://theorthocosmos.com/author/chris-cetta/.

Farran, Howard, "1298 The Dentist as an Inventor with Dr. Christopher Cetta : Dentistry Uncensored with Howard Farran" (Nov. 22, 2019) https://www.dentaltown.com/blog/post/13075/1298-the-dentist-as-an-inventor-with-dr-christopher-cetta-dentistry-uncensored-with-howard-farran.

Key, Stephen, "How to License a Design Patent", Inc. Magazine (May 3, 2019) https://www.inc.com/stephen-key/how-to-license-a-design-patent.html.

Bowman, S. Jay. "Upper-molar distalization and the distal jet." Journal of clinical orthodontics: JCO 50, No. 3 (2016): 159-169.

Daher, Sam, "Techniques for Class II Correction with Invisalign and Elastics", Invisalign (2013). https://s3.amazonaws.com/learn-invisalign/docs/06840000000GHgmAAG.pdf.

Umal, Vinay, et al., "Molar distalization—A review", Indian Journal of Orthodontics and Dentofacial Research, Jul.-Sep. 2018;4(3):146-150 https://www.ipinnovative.com/journals/IJODR/article-download/full-text/7539.

Chandra, Pratik, Sugandha Agarwal, Dipti Singh, and Sudanshu Agarwal. "Intra oral molar distalization—a review." Journal of Dentofacial Sciences 1, No. 1 (2012): 15-18.

Bolya, Piyush, Bhoopendra Singh Rajput, Gunjan Tiwari, Hitender Singh Yadav, Ashish Choubey, and Sandeep Kumar Swarnkar. "Intraoral approach to molar distalization: A review." IJOCR 2, No. 1 (2015): 75-80.

Sfondrini, M. F., V. Cacciafesta, and G. Sfondrini. "Upper molar distalization: a critical analysis." Orthodontics & craniofacial research 5, No. 2 (2002): 114-126.

Berkman, Mark E., Andre Haerian, and J. A. McNamara. "Interarch maxillary molar distalization appliances for Class II correction." Journal of Clinical Orthodontics 42, No. 1 (2008): 35.

Pithon, M., R. Santos, and A. Ruellas. "Distal jet modification: an option in distalization." Int. J. Odon 3 (2009): 71-77.

McSherry, P. F., and H. Bradley. "Class II correction-reducing patient compliance: a review of the available techniques." Journal of orthodontics 27, No. 3 (2000): 219-225.

Moro, Alexandre. "PowerScope." Orthotown.com (Mar. 2016).

Franchi, Lorenzo, Lisa Alvetro, Veronica Giuntini, Caterina Masucci, Efisio Defraia, and Tiziano Baccetti. "Effectiveness of comprehensive fixed appliance treatment used with the Forsus Fatigue Resistant Device in Class II patients." The Angle Orthodontist 81, No. 4 (2011): 678-683.

Padmavati, Dr, and Kishore Kumar. "Fixed Functional Appliance—A Review." European Journal of Molecular & Clinical Medicine 7, No. 2 (2020): 6399-6403.

Jayachandran, Santhosh. "Comparison of AdvanSyncTM and intermaxillary elastics in the correction of Class II malocclusions: A cephalometric study." (2016).

Wasey, Fahad, Shoborose Tantray, and Kaynat Rizvi. "Correction of Class II malocclusion with mandibular deficiency via PowerScope appliance." IP Indian Journal of Anatomy and Surgery of Head, Neck and Brain 6, No. 3 (2020): 113-118.

* cited by examiner

UNIMPEDED DISTALIZING JIG

CROSS REFERENCE TO RELATED APPLICATIONS

The present application is a non-provisional of U.S. Provisional Patent Application No. 62/771,495, filed Nov. 26, 2018, which is expressly incorporated herein by reference in its entirety.

FIELD OF THE INVENTION

The present invention relates to an orthodontic appliance for distalizing molars.

BACKGROUND OF THE INVENTION

Patient compliance is the one treatment variable that orthodontists historically have had, and currently still have, the least control over, and yet it remains a significant factor in treatment success and the time required to realize those assigned treatment objectives. There remains an unrelenting need to create or modify orthodontic appliances that would promote a greater willingness of the patient to invest the necessary time and effort to satisfy the requisite compliance.

For example, the once highly utilized headgear appliance, intended to generate additional space and/or orthopedically influence skeletal balance and symmetry between the opposing jaws, has lost favor with orthodontists because of the requisite wear-time commitments coupled with the frustrating inability to cultivate patient compliance to fulfill those desired objectives. Therefore, the need to create comparatively less intrusive appliances that will prove user-friendly and that can effectively supplant the dependency on past appliances is the creative goal with this proposal.

Carriere Lluch, U.S. Pat. No. 7,985,070 ("Segmental distalisation element for orthodontic treatments"), as shown in FIGS. 1-2, provides an apparatus for distalization, in which a segmental distalization element includes a smoothly arcuate central body equipped at one end with a head for adaptation to the canine and at the other end with a head for adaptation to the molar, connected to the arcuate body of the element via a zone of reduced cross-section, to increase the resilience of the distalization element in the zone and obtain direct, easy adaptation. The Carriere Lluch prior art provides distalization, but is limited to a fixed distance between the canine and molar, which is required by the continuous element connecting the two; desired movement of the molar is accompanied by movement of the canine anchor. Since the distance is fixed and non-adjustable, the appliance must fit the patient, leading to a requirement for an orthodontist to inventory a number of appliances to ensure availability when the need arises. Further, the appliance has a limited range of displacement, and in some cases, the appliance need be replaced with another to create the desired extent of distalization.

The Carriere Lluch prior art requires a flexible metal structure, as shown in FIGS. 1-2, and is thus formed preferably of super-resilient materials include those known as Ni—Ti such as Cu, Ni, Ti and Cr alloys. In some cases, a patient may be nickel-sensitive, and therefore the appliance could cause irritation or reaction. Noble, J., S. I. Ahing, N. E. Karaiskos, and W. A. Wiltshire. "Nickel allergy and orthodontics, a review and report of two cases." British Dental Journal 204, no. 6 (2008): 297. The principle of operation of the Carriere Lluch prior art provides a portion with a double elbow and constriction, characterized in that it has two successive angle folds and at the same time a constriction of the cross section of the material between the central portion of the distalization element and the end or terminal for coupling to the molar. The first of the angles, in other words the angle which connects the intermediate elbow to the main element or arcuate bridge of the distalization element will preferably be an obtuse angle while the second angle, in other words the angle between the intermediate bridge of smaller cross-section and the end shoe for application to the molar, can be a slightly obtuse or right angle. The angle between the end of the central arm of the device and the longitudinal axis of the shoe for fixing to the canine will also be of interest for defining the structure of the distalization element.

Carriere Lluch, U.S. Pat. No. 6,976,839, ("Auxiliary device for the segmental distalization of the canine-to-molar posterior maxillary area in orthodontic treatments") as shown in FIGS. 3, 4, and 5, relates to an auxiliary element for the segmented distalization of the posterior jawbone sector from canine to molar in orthodontic treatment. The element consists of two elements, a mesial segment composed of an anterior enlargement which with its inner base is fixed to the canine by adhesive and with its external portion facilitates retention of an elastic element, an arched extension in the shoulder, finished off by a ball-and-socket member at its end which is introduced into a receptacle located in the middle portion and outside of the distal segment by its base is joined by adhesive to the upper molar, that ball-and-socket member having a plurality of channels which facilitate its connection to a plurality of pivots in the lateral parts of the receptacle, the rotation between the two being limited by complementary projections provided in each segment.

The Carriere Motion 3D, a product according to Carriere Lluch U.S. Pat. No. 6,976,839, seeks to orthodontically distalize (or push back) the permanent first molars, hereinafter referred to as the molar benefactor. The Carriere Motion 3D prior art generates space by increasing the arch circumference (as measured from the mesial contact point of one first molar to the same contact point on the contralateral side), and/or to establish an improved dental articulation or interarch relationship between the opposing molars. The Carriere Motion 3D is size dependent, requiring a measurement of the actual distances between the first molars and the anterior units of fixation that will serve as the appliance's stabilizing abutment. Therefore, the Carriere Motion 3D prior art requires that the operator maintain an inventory of various sizes to particularly suit patient variations in measured distances.

In the prior art, the orthodontic forces are introduced through the employment of interarch elastic bands that extend from a hook on the bonded pad intrinsically associated with the stabilizing dental unit, to the opposing dental arch, which has been mechanically established as the anchor unit, as shown in FIGS. 1-5. When the elastic forces are applied as described, then its greater mechanical influence should be on the intended dental-unit benefactor, accepting the physical premise that the counter opposing forces will be levied and theoretically negated by the greater number of dental units that comprise the established anchor unit. The concept of creating an effective anchor unit is obtained through a variety of mechanical constructs as selected by the operator and is well known in the art. For example the Essix® (Colgate) retainer provides such a construct, and represents one of many commonly practiced means of establishing an anchorage unit; specifically, utilizing a fitted, clear plastic sleeve that collectively unites all of the opposing dentition as a singular entity that is optimally suited to serve as an effective anchorage unit.

Sheikh et al., U.S. Pat. No. 7,578,672, shown in FIG. 6, relates to an orthodontic device and method for treating malocculsions. The device includes an inter-dental arch telescoping assembly, which attaches between orthodontic wires on opposed dental arches.

See, U.S. Pat. Nos. 1,582,570; 1,908,853; 2,104,192; 3,162,948; 3,293,747; 3,690,003; 3,800,420; 3,835,540; 4,192,070; 4,348,177; 4,354,834; 4,373,914; 4,416,627; 4,427,380; 4,431,411; 4,462,800; 4,468,196; 4,483,674; 4,490,112; 4,496,317; 4,525,143; 4,571,178; 4,592,725; 4,595,361; 4,676,745; 4,708,646; 4,713,000; 4,795,342; 4,802,849; 4,818,226; 4,867,679; 4,871,310; 5,002,485; 5,007,828; 5,011,404; 5,022,855; 5,064,370; 5,066,224; 5,087,196; 5,092,768; 5,183,388; 5,205,736; 5,240,413; 5,277,581; 5,281,133; 5,299,935; 5,310,340; 5,334,015; 5,399,087; 5,429,501; 5,439,377; 5,505,616; 5,538,422; 5,562,445; 5,599,183; 5,622,493; 5,632,618; 5,645,422; 5,645,423; 5,645,424; 5,681,164; 5,697,779; 5,697,781; 5,711,667; 5,738,514; 5,752,823; 5,769,631; 5,775,907; 5,785,520; 5,820,369; 5,829,970; 5,829,971; 5,829,975; 5,846,074; 5,853,291; 5,873,715; 5,895,217; 5,897,313; 5,919,042; 5,938,437; 5,944,518; 5,964,588; 5,967,772; 6,036,488; 6,039,564; 6,082,996; 6,089,862; 6,113,390; 6,120,289; 6,162,051; 6,193,509; 6,220,856; 6,241,517; 6,322,357; 6,328,562; 6,341,956; 6,358,046; 6,382,966; 6,402,510; 6,425,758; 6,435,870; 6,520,772; 6,558,160; 6,607,382; 6,626,665; 6,655,959; 6,669,474; 6,719,557; 6,729,876; 6,783,361; 6,827,574; 6,877,982; 6,908,306; 6,913,460; 6,932,598; 6,976,839; 7,018,202; 7,094,051; 7,104,790; 7,108,508; 7,156,654; 7,238,022; 7,322,987; 7,331,781; 7,357,636; 7,416,407; 7,435,083; 7,458,810; 7,578,671; 7,578,672; 7,618,257; 7,785,102; 7,837,904; 7,878,803; 7,880,751; 7,905,724; 7,930,189; 7,955,075; 7,963,768; 7,970,627; 7,970,628; 7,985,070; 7,987,099; 8,099,305; 8,126,726; 8,192,196; 8,257,077; 8,257,078; 8,282,392; 8,348,664; 8,371,846; 8,439,672; 8,807,996; 8,807,998; 8,874,452; 8,882,499; 8,900,282; 8,905,754; 8,930,219; 8,932,054; 9,017,070; 9,101,437; 9,107,722; 9,144,474; 9,237,941; 9,242,118; 9,308,389; 9,333,053; 9,393,085; 9,414,897; 9,492,245; 9,517,113; 9,532,854; 9,539,066; 9,636,192; 9,649,176; 9,687,318; 9,730,780; 9,731,365; 9,814,543; 9,827,072; 9,844,424; 9,848,960; 9,861,451; 9,867,681; 9,877,803; 9,925,019; 9,980,791; 9,987,104; D751,208; D794,804; D802,145; D847,349; D848,001; RE35,170; 10,004,574; 10,064,706; 10,092,375; 10,111,730; 10,299,892; 10,383,704; 10,413,385; 10,433,932; U.S. Pub. App. Nos. 20020025502; 20030064344; 20030091952; 20030170585; 20070218415; 20090035715; 20100285422; 20110300502; 20120028208; 20130089828; 20130177861; 20140072928; and Foreign Patent Nos. EP0931518; ES2049306. Each patent or other reference cited herein is expressly incorporated herein by reference in its entirety.

SUMMARY OF THE INVENTION

The unimpeded distalizing jig has been designed for segmental distalization with the ultimate intent of improving the interdigitation between opposing dental arches and to create additional intra-arch space to adequately deliver and align the permanent teeth.

This design, is a substantial improvement over the Carriere Motion 3D, U.S. Pat. No. 7,985,070, FIGS. 3-5, expressly incorporated herein by reference in its entirety. The present design allows for instant modification in size to be made in the operatory setting, and allows the transference of applied forces without the hindrance or resistance intimately associated with the anterior stabilizing unit as in the prior art design. This enhancement focuses the generated orthodontic forces to the intended dental-unit benefactor(s) without the inherent frictional impedance that the prior art is dependent on, in order to maintain stability in its fixation.

While Sheikh et al., U.S. Pat. No. 7,578,672, FIG. 6, discloses a telescoping assembly, as also exists in other types of orthodontic appliances, Sheikh et al., U.S. Pat. No. 7,578,672 discloses an inter-dental arch device, not one which acts within an intra-dental arch between teeth. Further, the purpose of the telescoping assembly according to the present invention is to guide distalizing forces is along a sagittal oriented axis, which is a distinct function from the known devices, which accommodate changing distances from jaw movement.

The present invention provides a telescoping structure, with a distalizing force preferably generated by an inter-dental arch elastic element. The sagittal vector of force is inappreciably sustained by a bondable attachment to a selected anterior stabilizing dental unit, e.g., a canine tooth, therein delegating the applied distalizing force to the posterior, intra-dental fixation point located on the molar benefactor. The telescoping structure is preferably curved, which achieves two purposes: first, it provides appropriate clearance over a range of applications, and thus minimizes the need for an orthodontist to inventory multiple appliances (the length of the rod may be adjusted in-procedure).

In a typical case, the distalization process applies a force on the labial surface of the intended dental-unit benefactor that acts independently from the anterior stabilizing dental-unit with respect to the magnitude of distalization to be realized, and therefore, a universal joint is provided in the attachment of the molar to the jig. Conversely, the jig may be rigidly bonded or attached to the anterior fixation unit, since no force is applied to the anterior unit except to normalize the force vector supplied by the elastic, which is a low force that typically will induce no repositioning of the anterior fixation unit.

On the other hand, in some cases, the universal joint may be replaced with a single axis joint or a rigid attachment, as may be necessary to introduce a physical couple with a counter moment designed and intended to mitigate the rotational influences or moments that would otherwise be realized with the application of a single force, thus achieving distal translation of the molar benefactor. In this case, the joint need not be directly on the tooth surface, by may be extended from the surface by 1-5 mm. Note that due radius of the telescoping structure provides potential rotation of the molar while it is distalized, due to the changing angle of rotation, if the distal fixation is not a universal joint. While this angle is fixed per the radius of curvature of the telescoping structure, it is possible to supply different radii structures for special cases. The radius may be, for example 3-12 inches, with the "standard" design for adolescents about 8-10 inches. The short radius may be appropriate for infants and large rotation situations, while the larger radii appropriate for adults and situations where rotation is undesired.

The anterior fixation is typically by means of a rigid joint, e.g., the rod extending as an integral extension from a bond pad. The posterior fixation is typically by means of a universal joint as discussed above, which is connected to the tubular structure.

In some cases, it is desired to apply only a horizontal force to the molar, and therefore instead of a universal joint fixation, the posterior fixation may be a horizontal rotatable pivot. In other cases, the rotation of the distalizing molar is desired to be greater than the radius of curvature of the rod, and this may be achieved by providing a vertical rotatable constrained pivot, with the rotational moment dependent on the distalization extent and the distance of the vertical rotatable pivot from the molar central axis. Typically, use of a rigid joint on the molar fixation is undesired, in that it complicates installation without substantial benefit.

Because the force is applied between the intra-dental arch and the tubular structure, the force on the anterior fixation unit is limited to the normalizing force to correct the angle of the rod to the angle of the elastic, and is a small value which does not cause substantial movement of the anterior fixation unit.

Because the structure does not flex during use, components may be formed of stainless steel, e.g., 304, 316, 17-4 PH SS, SR-50A, SR-6DX SFSS SR-3Mo, and avoid substantial risk of adverse material reactions. Clear plastic materials, or matched tooth color materials, or decorative color materials, may also be used. The distalizing jig may be 3D printed, or some or all components may be 3D printed, such as from polymer or powdered metal (e.g., laser sintered).

The distalizing and anchor fixations are typically through standard adhesive bond pads, though as required alternate fixation may be employed.

It is therefore an object to provide an unimpeded distalizing jig, comprising: a pair of tooth fixation mechanisms; an intra dental arch telescoping assembly, comprising a rod-like insertion and a tubular shell, which constrains the rod-like insertion to move with respect to the tubular shell along an elongated axis; and a force generating structure configured to supply an off-axis distalizing force to the intra dental arch telescoping assembly, such that the distalizing force is provided to the posterior tooth substantially without applying an anteriorizing force on the anterior tooth.

It is also an object to provide a method for unimpeded distalization, comprising: affixing a pair of tooth fixation mechanisms between teeth on the same dental arch; connecting the pair of tooth fixation mechanisms with an intra dental arch telescoping assembly, comprising a rod-like insertion and a tubular shell, which constrains the rod-like insertion to move with respect to the tubular shell along an axis of movement; and generating an off-axis distalizing force to the intra dental arch telescoping assembly, such that the distalizing force is provided to the posterior tooth along the axis of movement of the telescoping assembly, substantially without applying an anteriorizing force on the anterior tooth.

It is a still further object to provide an orthodontic distalizing appliance, comprising: a curved rod having an adhesive tooth of tooth fixation pad at one end; a curved tube, having a universal joint linkage to an adhesive tooth fixation pad at one end; the curved rod and the curved tube being operable to form a radially-operable telescoping assembly; and a hook, affixed to the curved tube, configured to supply a distalizing force from an elastic band to separate the adhesive tooth fixation pad of the curved rod and the adhesive tooth fixation pad of the curved tube.

It is also an object to provide a distalizing kit, comprising: a curved rod having an adhesive tooth of tooth fixation pad at one end; a curved tube, having a first portion of a universal joint linkage at one end, having a hook configured to supply a distalizing force from an elastic band to separate the adhesive tooth fixation pad of the curved rod and the adhesive tooth fixation pad of the curved tube, the curved rod and the curved tube being operable to form a radially-operable telescoping assembly; and an adhesive tooth fixation pad having a second portion of a universal joint linkage.

The pair of tooth fixation mechanisms may comprise at least one universal joint. The pair of tooth fixation mechanisms comprises at least one rigid joint. The pair of tooth fixation mechanisms comprises a universal joint and a rigid joint.

The tubular shell may be adapted to be connected to the distal tooth through a first tooth fixation mechanisms and the rod-like insertion is adapted to be connected to the anterior tooth through a second tooth fixation mechanisms.

The tubular shell may be adapted to be connected to the anterior tooth through a first tooth fixation mechanism and the rod-like insertion is adapted to be connected to the posterior tooth through a second tooth fixation mechanisms.

The force generating structure may comprise a hook for receiving an elastic loop.

The force generating structure may comprise a hook for receiving an elastic loop which is fixed on a tooth on an opposite dental arch, to provide an intra dental arch distalization force.

The orthodontic distalizing appliance may be used in conjunction with an elastic band attachment adapted for mounting on an opposed dental arch. The orthodontic distalizing appliance may further comprise a custom fitted anchor unit (e.g., of clear plastic), which exposes the elastic band attachment, to maintain the teeth of the opposed dental arch in relative position.

The intra dental arch telescoping structure may be circularly curved, to provide a radial axis of movement of the rod-like structure with respect to the tubular shell.

The unimpeded distalizing jig may further comprise an O-ring at an open end of the tubular shell, configured to seal the tubular shell around the tubular rod. The O-ring may be made of Teflon.

The rod and tube are preferably formed of stainless steel. However, the components may be formed of other suitable materials, and, for example, may be formed of transparent plastic.

BRIEF DESCRIPTION OF THE DRAWINGS

FIGS. 15-17 show photos of the distalizing jig according to the present invention with elastic installed and uninstalled, wherein FIGS. 15 and 16 represent the tooth positioning prior to distalization, and FIG. 17 represents the tooth positioning after the desired distalization.

DETAILED DESCRIPTION OF THE PREFERRED EMBODIMENTS

Figure 7:
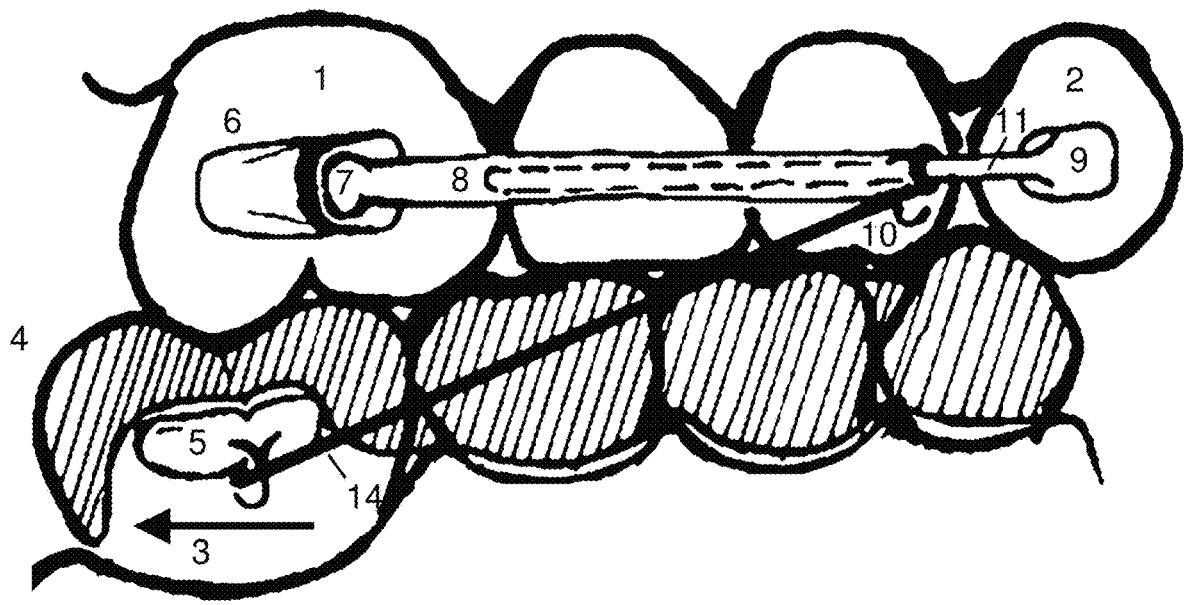
FIG. 7 shows a schematic side view of an embodiment of the present invention
Figure 8:
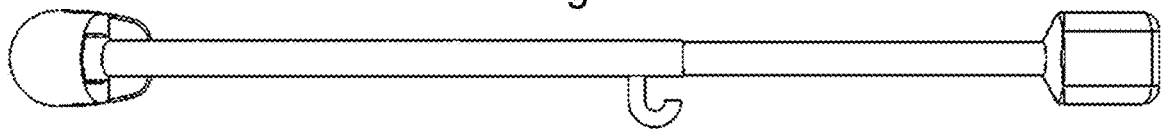
FIG. 8 shows a side view of an assembly according to the present invention.

The unimpeded distalizing jig according to the present invention, as depicted in FIG. 7, has three components.

Figure 9:
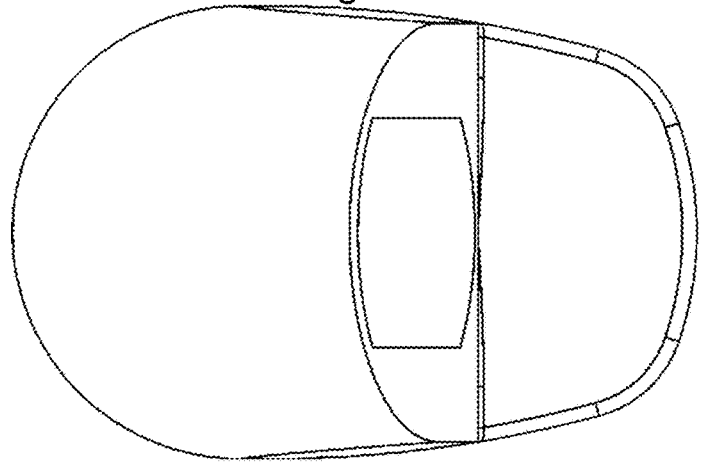
FIG. 9 shows a top view of a tooth bonding pad with a universal joint according to the present invention.
Figure 10:
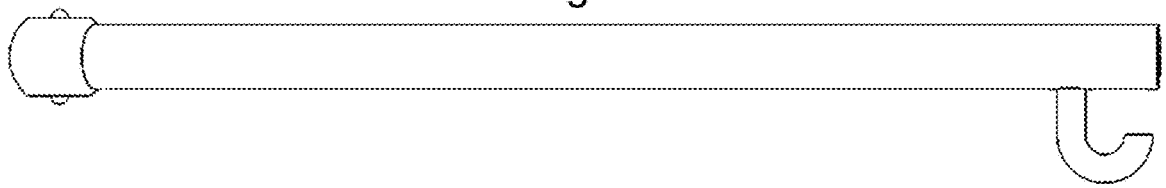
FIG. 10 shows a side view of a tubular component according to the present invention.

FIG. 7 shows an embodiment of the invention in a use configuration. The first component, also as shown in FIG. 9 is a bondable pad 6 that is attached to, e.g., the labial surface of the first permanent molar 1. The bondable pad 6 has a recess to receive an end 7 of the second component, which is a cylindrical-tube 8 also shown in FIG. 10, that can rotate within the bondable pad 6, akin to a ball-in-socket joint. The cylindrical-tube 8 allows for the introduction of the third component, which is a rod-like structure 11, also shown in FIGS. 11-14, which has on its end opposite the ball 7 another bondable pad 9 that can be bonded or secured to the anterior stabilizing unit 2. An elastic band 14 retaining attachment pad 5 is bonded to a tooth, e.g., a molar on the other dental arch. An anchor unit 4 is established by providing a mechanical construct, such as a custom-fitted clear plastic sleeve that collectively unites all of the opposing dentition as a singular entity, e.g., similar to an Essix® (Colgate) retainer unit.

Figure 15:
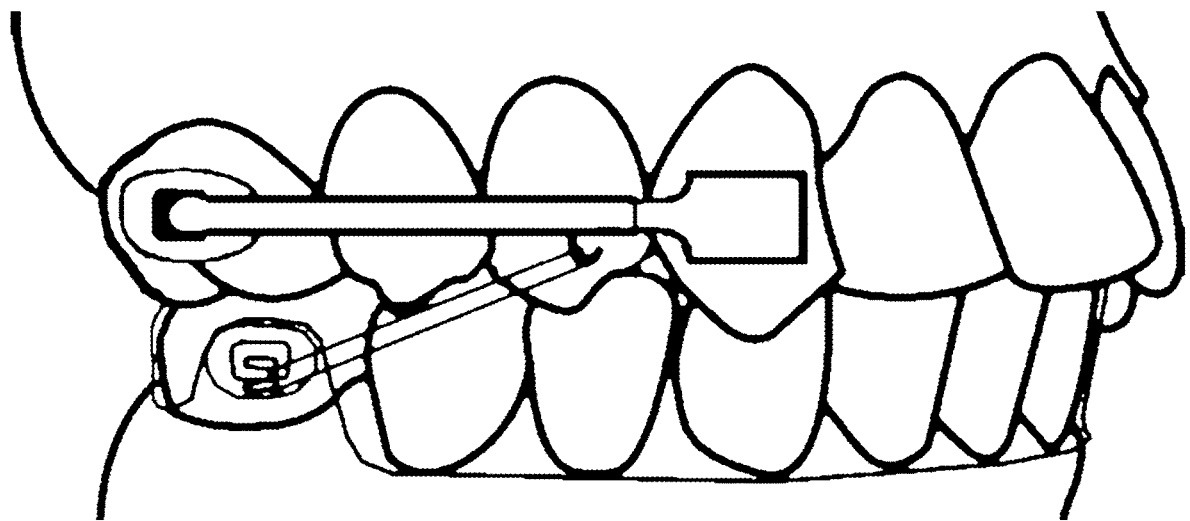
Figure 16:
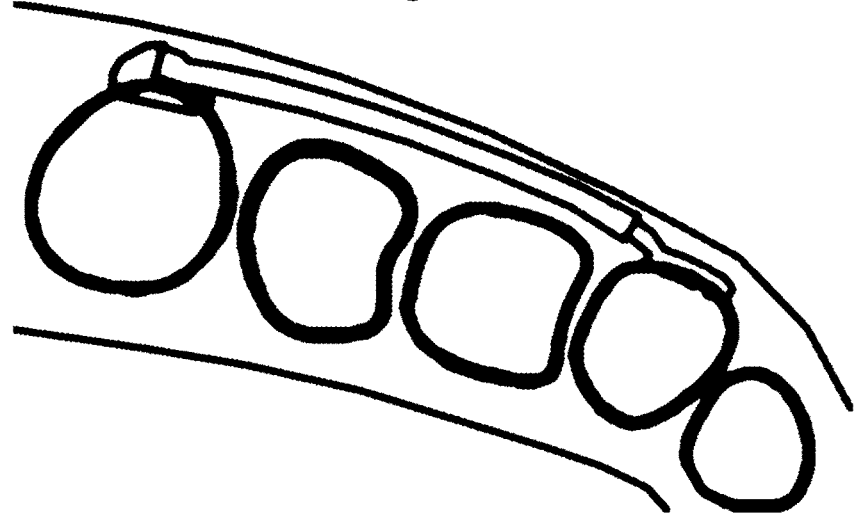
Figure 17:
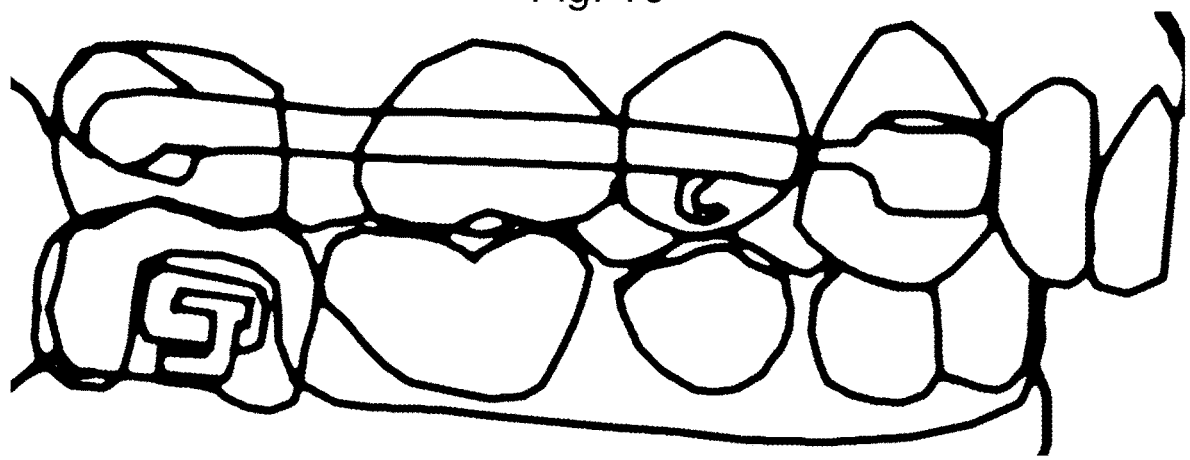

After installation, the unimpeded distalizing jig appears as shown in FIG. 15. An elastic band 14 fixation is attached to the bondable pad provided on a tooth on the opposing dental arch, to supply the distalization force, as shown in FIGS. 7 and 16. This is a standard elastic fixation type.

The practitioner performing the installation can cut this rod to size, as predicated by the existing distance between the involved molar benefactor and its associated anterior, stabilizing unit 2.

Figure 11:
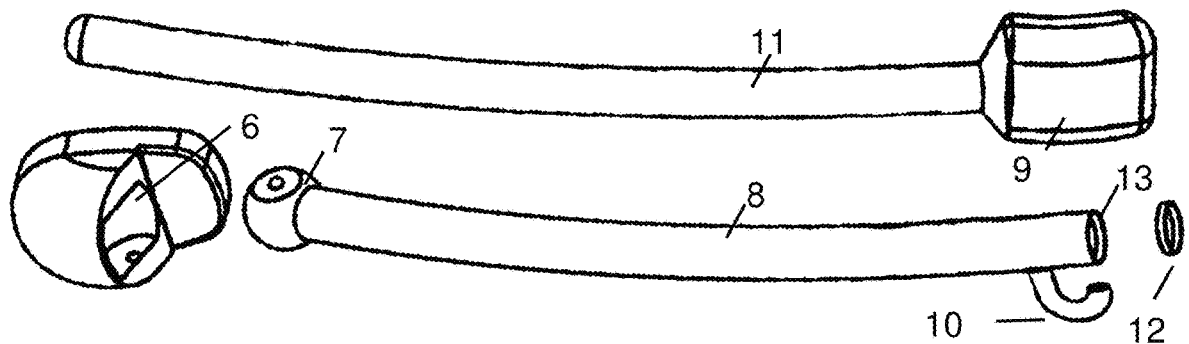
FIG. 11 shows a side exploded view of a tubular component, O-ring, rod with tooth bonding pad, and tooth bonding pad with a universal joint according to the present invention.
Figure 12:
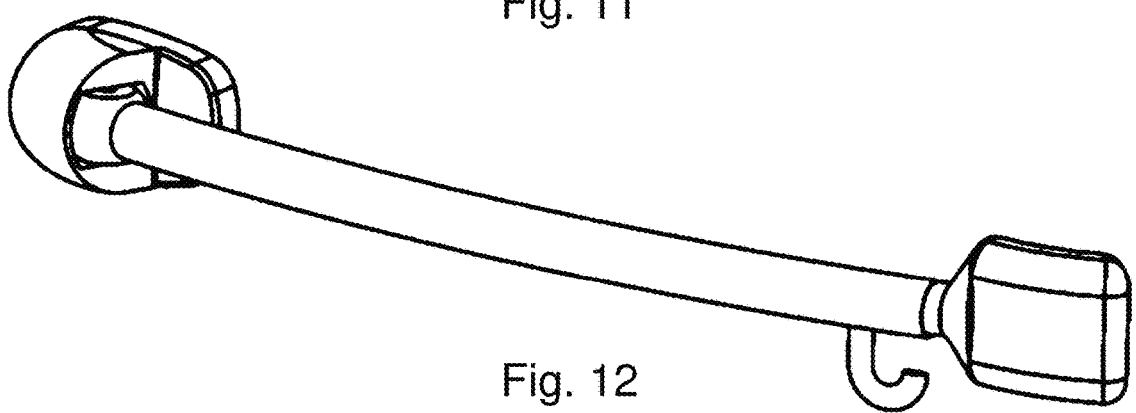
FIGS. 12-14 show side assembled views of a tubular component, rod with tooth bonding pad, and tooth bonding pad with a universal joint according to the present invention, in various states of telescoping action.
Figure 13:
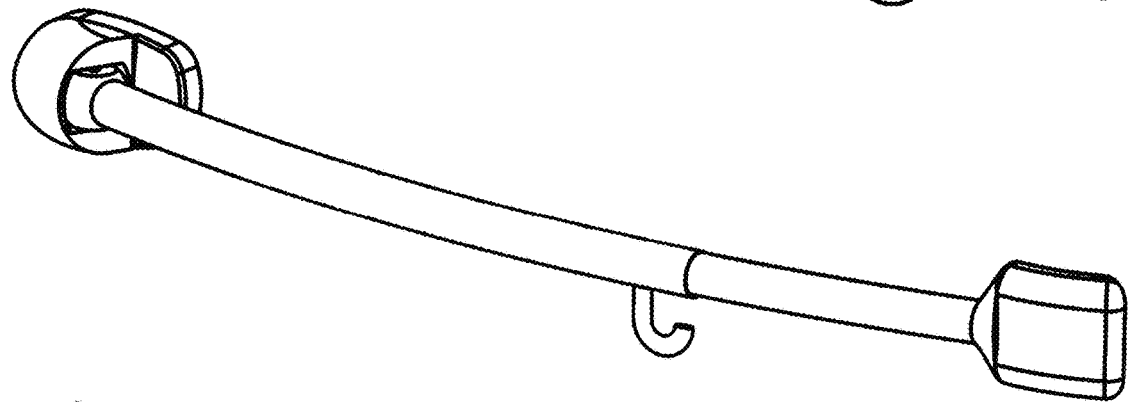
Figure 14:
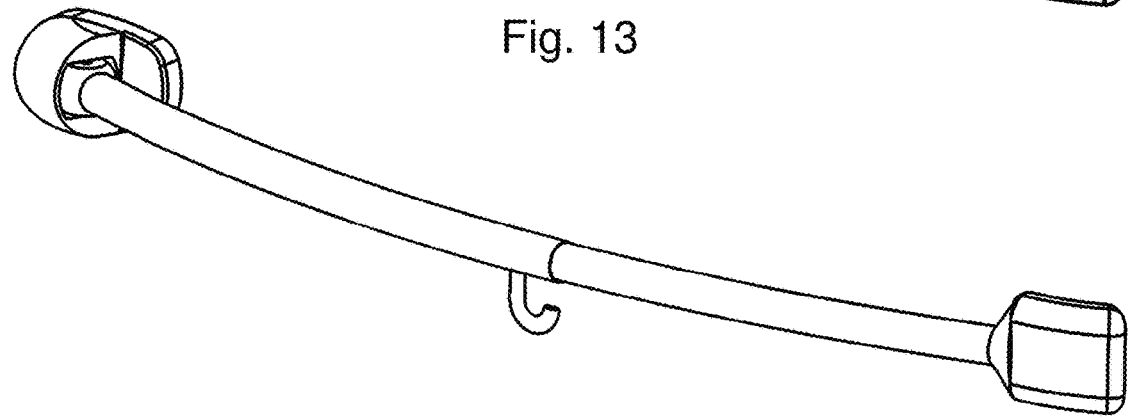

The cylindrical-tube 8 may have a Teflon O-ring 12, as shown in FIG. 11, incorporated on its open end 13, which has an internal diameter that will match the diameter of the rod-like structure 11 insert associated with the anterior bondable pad 9. The purpose of the O-ring 12 is to establish an integrated seal between the interactive components, thus allowing for telescopic extension without adding appreciable resistance to the orthodontic force delivery system. Along with the incorporation of this O-ring 12, it may be necessary to include a weep hole distal to the opened end of the cylindrical-tube 8 (not shown) to allow for the escape of fluids and saliva that inadvertently find entry into the cylindrical-tube 8. In general, the rod-like structure 11 in the cylindrical-tube 8 (cylinder) acts as a constraint that permits radial forces with respect to the ball like end 7-in-socket-like portion of the bondable pad 6 fixture, thus prohibiting the introduction of a misaligned force, such that a dental elastic band 14 attached between the hook 10 on the cylindrical-tube 8 and the elastic band 14 retaining attachment pad 5 on the other dental arch, effectively applies this force without inducing a significant off-axis component. For example, if the mean angle between the elastic band 14 retaining attachment pad 5 and the hook 10 is 15 degrees, the components of the force in the vertical axis is ~26%, and along the horizontal axis is 97%. Thus, the cylindrical-tube 8 allows the hook 10 to be displaced anteriorly with respect to the bondable pad 6, to achieve a small angle. Meanwhile, the bondable pad 9 does not see the horizontal force at all, due to the telescoping members, and sees only a portion of the vertical force. For example, if the horizontal distance between the elastic band 14 retaining attachment pad 5 and the hook 10 is 80% of the distance to the bondable pad 9, then the vertical force will by only about 20% of the elastic force.

The O-ring 12 also avoids lodging of food in the cylinder, which can lead to loss of radial freedom of movement and bacterial overgrowth.

In general, the cylindrical-tube 8 need not be linear (e.g., consistent with FIG. 10), and rather may be curved along its axis as shown particularly in FIGS. 11-14 and 17, to accommodate the curved layout of the teeth in the mouth, and the intended force vector on the molar benefactor. Advantageously, the cylindrical-tube 8 is toroidal, and the rod-like structure 11 has a corresponding radius of curvature. The axis of the force will then be aligned with the tangent of the curve of the rod-like structure 11 at the point of contact with the O-ring 12. The circular curvature will tend to avoid binding as might be observed with non-circular profiles, though the constraint is actually that, over the expected range of movement, that the rod-like structure 11 not bind within the cylindrical-tube 8 sleeve, For example, if the cylindrical-tube 8 has a sidewall cutout, the rod-like structure 11 could extend through the cutout to avoid binding, and this need not in that case have the same radius of curvature. However, a sidewall cutout would reduce strength, permit intrusion of food, and is unnecessary.

Figure 6:
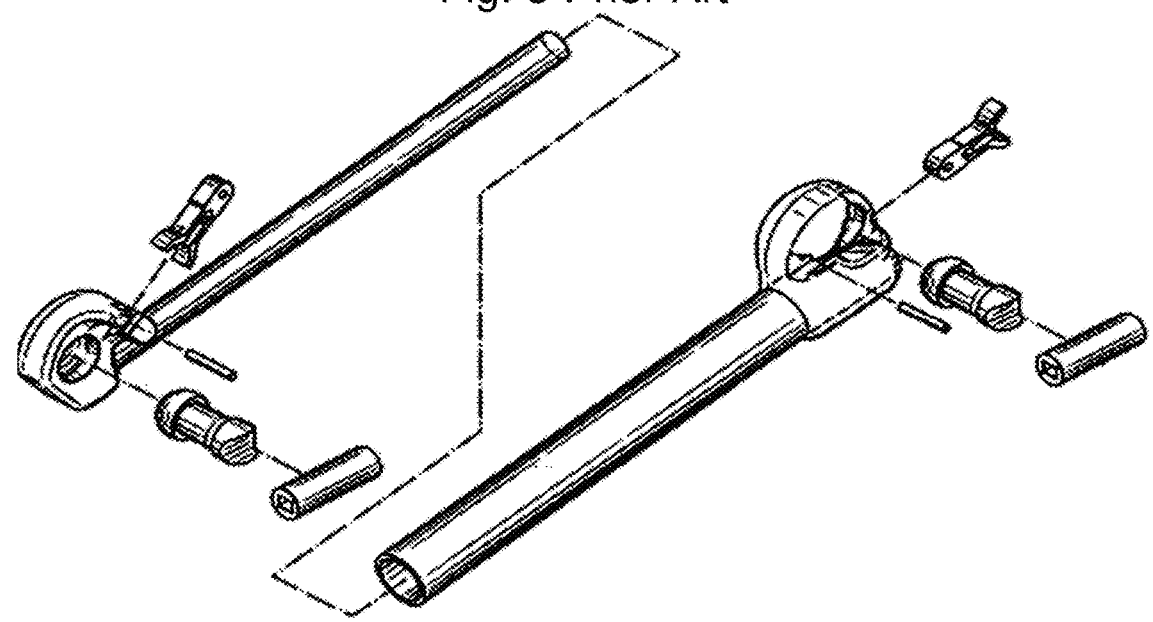
FIG. 6 shows an exploded view of an orthodontic device and method for treating malocculsions.

A small hook 10 extends inferiorly from the anterior open-end of the cylindrical-tube 8 when the apparatus is installed on the maxillary arch (as shown in FIGS. 15-16), and superiorly when the apparatus is installed on the mandibular arch (not shown). When the elastic band 14 is engaged from the aforementioned hook 10 to the hook on the elastic band 14 retaining attachment pad 5 on the opposing dental arch serving as the anchor unit, as shown in FIGS. 7 and 15, the forces will be directed primarily to the molar 1 benefactor to promote both its intended distal rotation and translation according to the axis of the cylindrical-tube 8. The cylindrical-tube 8 is designed to move away, or in distal direction (see arrow 3 in FIG. 6), from the anterior stabilizing unit 2 in a telescoping motion, thereby reducing the resistance that the anterior stabilizing unit 2 would adversely add to the desired distalization of the molar 1 benefactor.

It is noted that the tube and rod may be reversed from the preferred layout, with a rod fixed posteriorly and a tube fixed anteriorly. However, this arrangement requires that the elastic band hook be attached to the rod.

Of course, alternate elastic or spring tension may be applied, instead of the standard elastic bands, however, due to their availability, convenience, low cost, simplicity, non-toxicity, and functionality, elastic bands are preferred. Tensile forces may alternately be applied by steel or memory metal (typically nickel-titanium alloys), pneumatic or hydraulic actuators, magnetic (e.g., permanent magnet) or electromagnetic motors or actuators, without particularly altering the three basic components of the invention, other than their linkage to the force applying element.

It is important to define resistance as the cumulative imposition of movement of a dental unit or units in response to the introduction of an applied force. In the Carriere Motion 3D prior art shown in FIGS. 3-5, both the molar benefactor and the anterior stabilizing dental-unit collectively generate this resistance, as a singular fixed extension arm physically unites them. Therefore, to provide the desired distalizational response to the molar benefactor would require the effective mitigation of the unintended or impeding distalization of the anterior stabilizing dental-unit. In summary, this would generate greater resistance or impedance, thus challenging the optimal physical mechanics and realization of the orthodontic objective.

The unimpeded distalizing jig according to the present invention provides the following advantages not currently available in the prior art:

Flexibility in customizable sizing features, thus reducing the operating costs to maintain adequate inventory; and, The unrestrained, independent cylindrical-tube contrivance is without any appreciable resistance or impedance from the anterior stabilizing component, thus allowing for more effective distalization of the molar benefactor.

Figure 1:
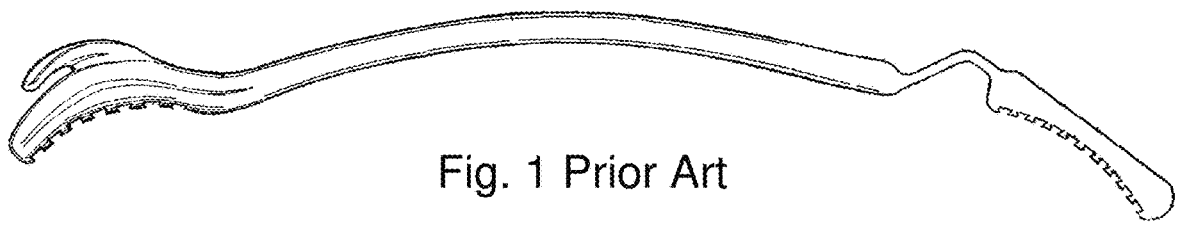
FIGS. 1-2 show views of a prior art distalizer according to U.S. Pat. No. 7,985,070.
Figure 2:
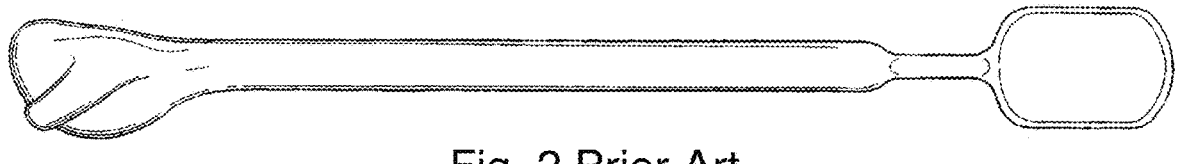
Figure 3:
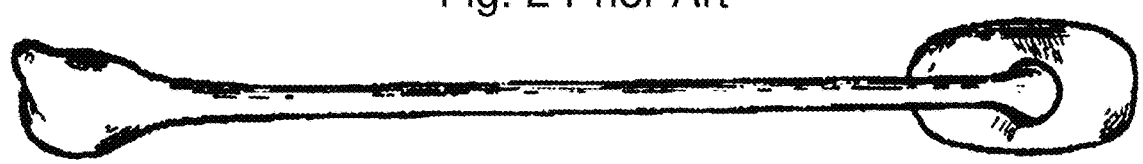
FIGS. 3-5 show views of a prior art distalizer according to U.S. Pat. No. 6,976,839.
Figure 4:
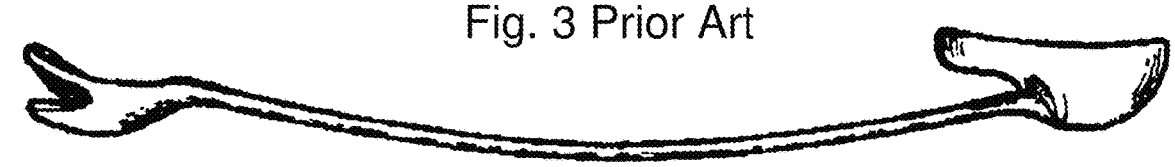
Figure 5:
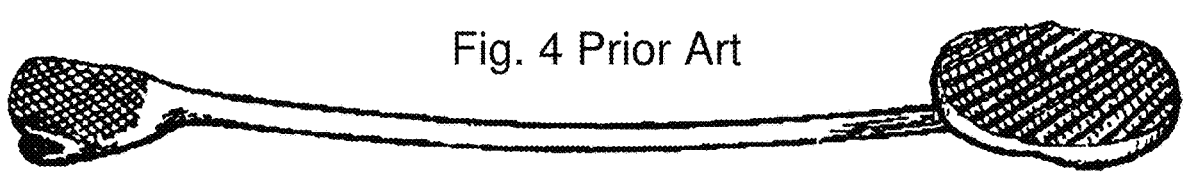

While the unimpeded distalizing jig may share a visual resemblance to the Carriere Motion 3D prior art shown in FIGS. 3-5, it offers key advantageous physical and mechanical properties that distinguishes it as uniquely suited to perfect the desired orthodontic objective and response.

Various alternatives, modifications, and equivalents may be used in lieu of the above components. Further, while the invention has been shown and described with reference to an embodiment thereof, those skilled in the art will understand that the above and other changes in form and detail may be made without departing from the spirit and scope of the following claims.

What is claimed is:

1. An unimpeded distalizing jig, comprising:
a pair of tooth fixation mechanisms comprising an anterior tooth fixation mechanism for attachment to an anterior tooth of a dental arch and a posterior tooth fixation mechanism for attachment to a posterior tooth of the dental arch;
an intra dental arch telescoping assembly, comprising a tubular shell sealed around a rod-like insertion, which constrains the rod-like insertion to freely move with respect to the tubular shell along an elongated path between the anterior tooth fixation mechanism and the posterior tooth fixation mechanism; and
a tensile force communicating structure affixed to an exterior of the tubular shell, configured to selectively supply a distalizing force to separate the posterior tooth fixation mechanism from the anterior tooth fixation mechanism along the elongated path of the intra dental arch telescoping assembly concurrent with a distalizing movement of the posterior tooth fixation mechanism, such that the distalizing force is selectively provided to the posterior tooth fixation mechanism along the elongated path substantially without applying a force to the anterior tooth fixation mechanism unit except to normalize a force vector to correct an angle of the rod-like insertion to the tensile force communicating structure, without applying an anteriorizing force on of the anterior tooth fixation mechanism.

2. The unimpeded distalizing jig according to claim 1, wherein the pair of tooth fixation mechanisms comprises at least one bondable pad having a recess configured to receive an end of the tubular shell to form a repositionable joint.

3. The unimpeded distalizing jig according to claim 1, wherein the pair of tooth fixation mechanisms comprises a universal joint and a rigid joint.

4. The unimpeded distalizing jig according to claim 1, wherein the tubular shell is connected to supply the distalizing force to the posterior tooth fixation mechanism and the rod-like insertion is connected to the anterior tooth fixation mechanism, wherein when no tensile force is applied to the tensile force communicating structure, no force is applied to the anterior tooth or the posterior tooth.

5. The unimpeded distalizing jig according to claim 1, wherein the tubular shell is sealed around the rod-like insertion with an O-ring, and wherein the tubular shell has a weep hole configured for escape of fluids and saliva from the tubular shell.

6. The unimpeded distalizing jig according to claim 1, wherein the tensile force communicating structure comprises a hook for receiving an elastic loop which is fixed on a tooth on an opposite dental arch with respect to the dental arch, to provide an intra dental arch tensile distalization force.

7. The unimpeded distalizing jig according to claim 1, wherein the intra dental arch telescoping assembly is circularly curved, to provide a curved elongated path movement of the rod-like insertion with respect to the tubular shell.

8. The unimpeded distalizing jig according to claim 1, wherein the tubular shell is sealed around the rod-like insertion with an O-ring at an open end of the tubular shell.

9. A method for unimpeded distalization, comprising:
affixing a pair of tooth fixation mechanisms comprising an anterior tooth fixation mechanism on an anterior tooth of a dental arch and a posterior tooth fixation mechanism on a posterior tooth on the same dental arch;
connecting the pair of tooth fixation mechanisms with an intra dental arch guiding assembly, comprising a tubular shell sealed around a rod-like insertion, which constrains and guides the rod-like insertion to move axially along the tubular shell along a predefined path of movement; and
generating a tensile distalizing force on the tubular shell via a hook affixed to the tubular shell, which is off axis with respect to the predefined path, such that the tensile distalizing force is selectively applied through the tubular shell only to the posterior tooth fixation mechanism along the predefined path of movement of the guiding assembly concurrent with a distalizing movement of the posterior tooth fixation mechanism, substantially without applying an anteriorizing force on the anterior tooth fixation mechanism.

10. The method according to claim 9, wherein the pair of tooth fixation mechanisms comprises at least one bondable pad having a recess configured to receive an end of the tubular shell to form a repositionable joint.

11. The method according to claim 9, wherein the pair of tooth fixation mechanisms comprises a universal joint and a rigid joint.

12. The method according to claim 9, wherein the tubular shell is connected to the posterior tooth fixation mechanism and the rod-like insertion is connected to the anterior tooth fixation mechanism, and when the tensile distalizing force on the tubular shell is relieved, no force is applied to the anterior tooth or the posterior tooth.

13. The method according to claim 9, wherein the tensile distalizing force is applied to the hook on the tubular shell, by an elastic loop.

14. The method according to claim 13, further comprising retaining the elastic loop on a tooth on an opposite dental arch from the dental arch, and on the hook affixed to the tubular shell, to provide the tensile distalization force.

15. The method according to claim 9, wherein the intra dental arch guiding assembly is circularly curved, to provide a circumferential path of movement of the rod-like insertion with respect to the tubular shell.

16. The method according to claim 9, further wherein the tubular shell is sealed around the rod-like insertion with an O-ring at an open end of the tubular shell.

17. An orthodontic distalizing appliance, comprising:
a rod having an adhesive tooth fixation pad at one end;

a tube, having a universal joint linkage to an adhesive tooth fixation pad at one end and being and being configured to seal around the rod;

the rod and the tube being operable to form a radially-operable telescoping assembly wherein the rod is configured to freely move selectively along a predefined path within the tube in response to a force; and a hook, affixed to an exterior of the tube, configured to supply a tensile distalizing force from an elastic band, to separate the adhesive tooth fixation pad of the rod and the adhesive tooth fixation pad of the tube along the path, without applying an anteriorizing force on the rod along the path, and without contact with any other tooth between the adhesive tooth fixation pad of the rod and the adhesive tooth fixation pad of the tube.

18. The orthodontic distalizing appliance according to claim 17, wherein the tube is a curved tube configured to be connected to a posterior tooth and the rod is a curved rod configured to be connected to an anterior tooth of a common intradental arch, and the path is a predefined curved path.

19. The orthodontic distalizing appliance according to claim 17, wherein the orthodontic distalizing appliance is adapted for attachment to an anterior tooth and attachment to a posterior tooth of a dental arch, the orthodontic distalizing appliance further comprising an elastic band attachment adapted for mounting on an opposed dental arch and supplying the tensile distalizing force via an elastic loop on the elastic band attachment and the hook.

20. The orthodontic distalizing appliance according to claim 19, further comprising a clear plastic custom fitted anchor unit for the opposed dental arch, which exposes the elastic band attachment, configured to maintain the teeth of the opposed dental arch in relative position.

* * * * *